Jan. 3, 1933.  W. D. WILCOX  1,892,862
APPARATUS FOR THE THERMAL DISSOCIATION
OF HYDROCARBON GASES AND VAPORS
Filed June 28, 1930  3 Sheets-Sheet 1

INVENTOR.
William D Wilcox.

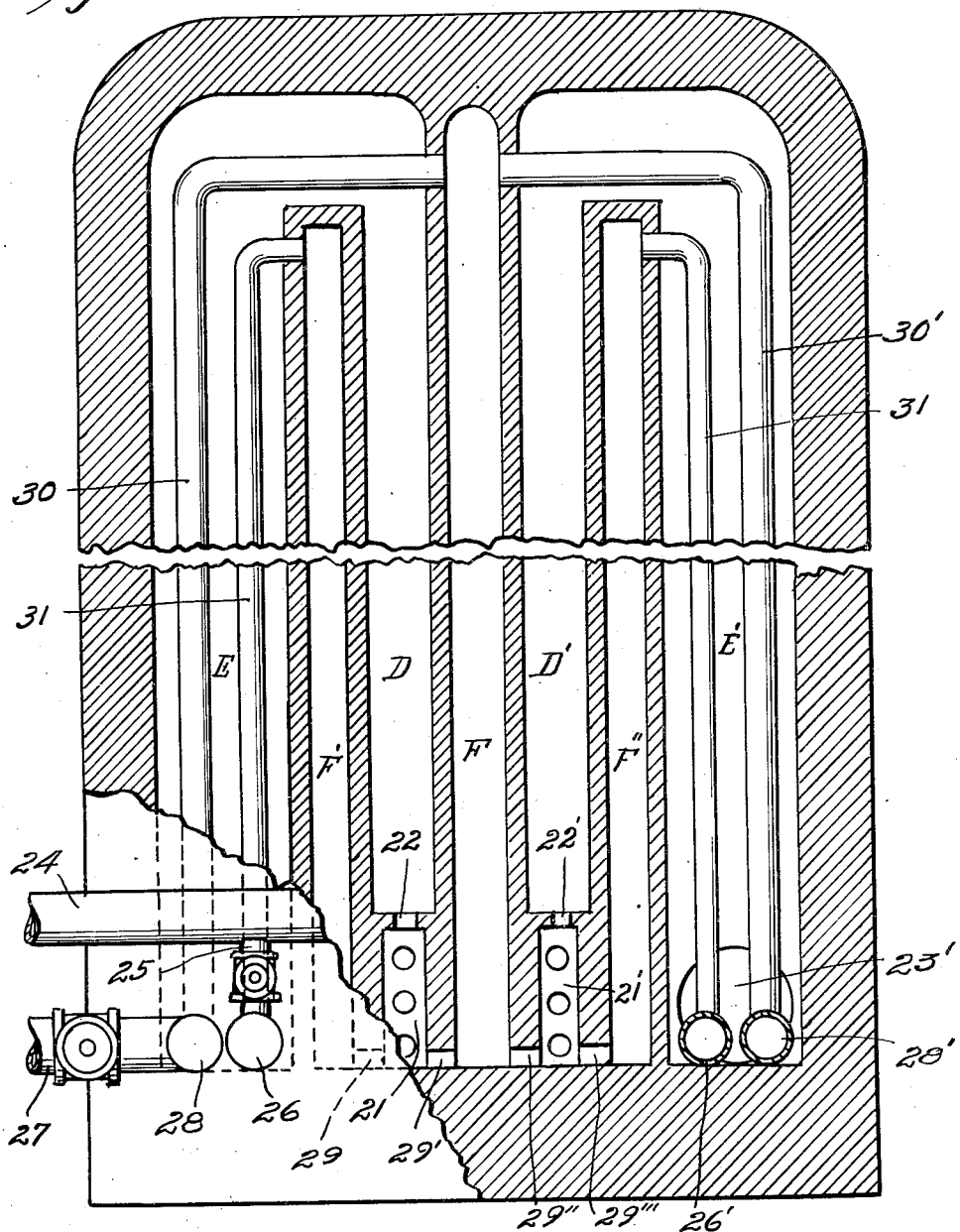

Patented Jan. 3, 1933

1,892,862

UNITED STATES PATENT OFFICE

WILLIAM D. WILCOX, OF LAWRENCE, KANSAS

APPARATUS FOR THE THERMAL DISSOCIATION OF HYDROCARBON GASES AND VAPORS

Application filed June 28, 1930. Serial No. 464,688.

My apparatus is specially adapted to produce carbon black by the thermal dissociation of hydrocarbon gases and vapors according to the general formula $$CH_4 + heat = C + 2H_2$$

and to yield a residue gas composed of hydrogen and nitrogen in the volumetric proportions of three and one, adapted to use in the synthesis of ammonia. Numerous patents have been issued covering process and apparatus designed to produce carbon black and/or hydrogen by the subjection of hydrocarbon gases or vaporized oils to a high temperature.

In some, external heating is employed; in others, gas is passed through incandescent coke or through a chamber filled with checker brick brought to incandescence by precedent blasting. In none, so far as I have been able to ascertain, has there been effected a mixture of nitrogen from the air with the hydrogen freed from oxygen in the desired proportions of one and three; nor, as a fact, has dissociation been carried to such completion as to entirely eliminate hydrocarbon gases from the residue gas. In one plant where the hydrogen obtained has such value as to justify long-continued contact of the hydrocarbons with the source of heat, the per cent of such gases remaining has been brought within a possible 5%.

While temperatures have been stated at which, equilibrium having been attained, the hydrocarbon residue would be practically negligible, the means of creating these temperatures have been inadequate, or the time required to effect the reaction so long that the procedure is not commercially practicable, except in situations and for uses in which the presence of some undecomposed hydrocarbons is not a matter of consequence. Nor has there been complete success in the recovery of carbon. Much has remained in the zone of high temperature and either not recovered or, if later removed by mechanical means, has had its value impaired by a sintering together of the particles, reducing greatly the average fineness of division, which is a chief element of its value.

Figure 1:
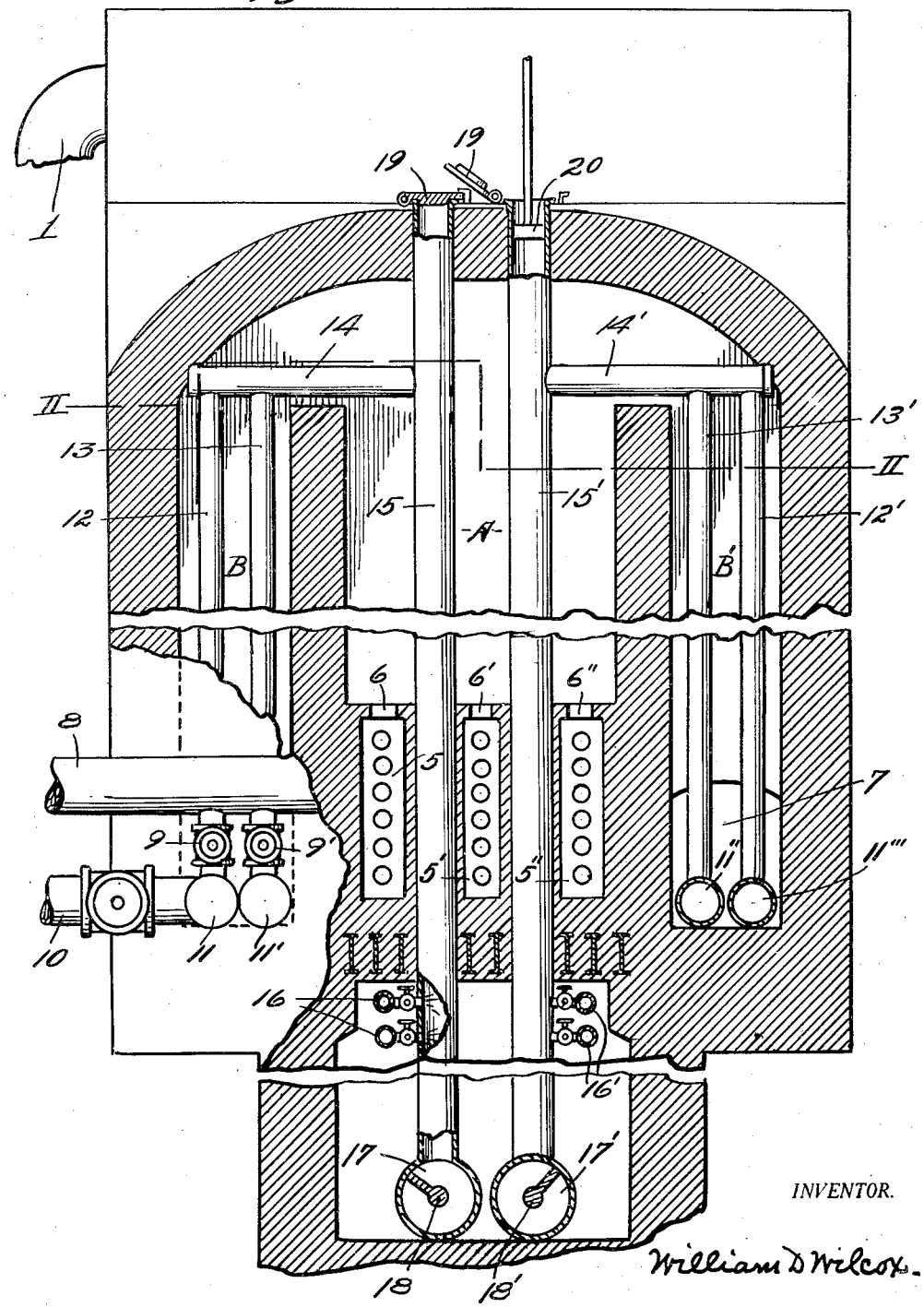
Figure 2:
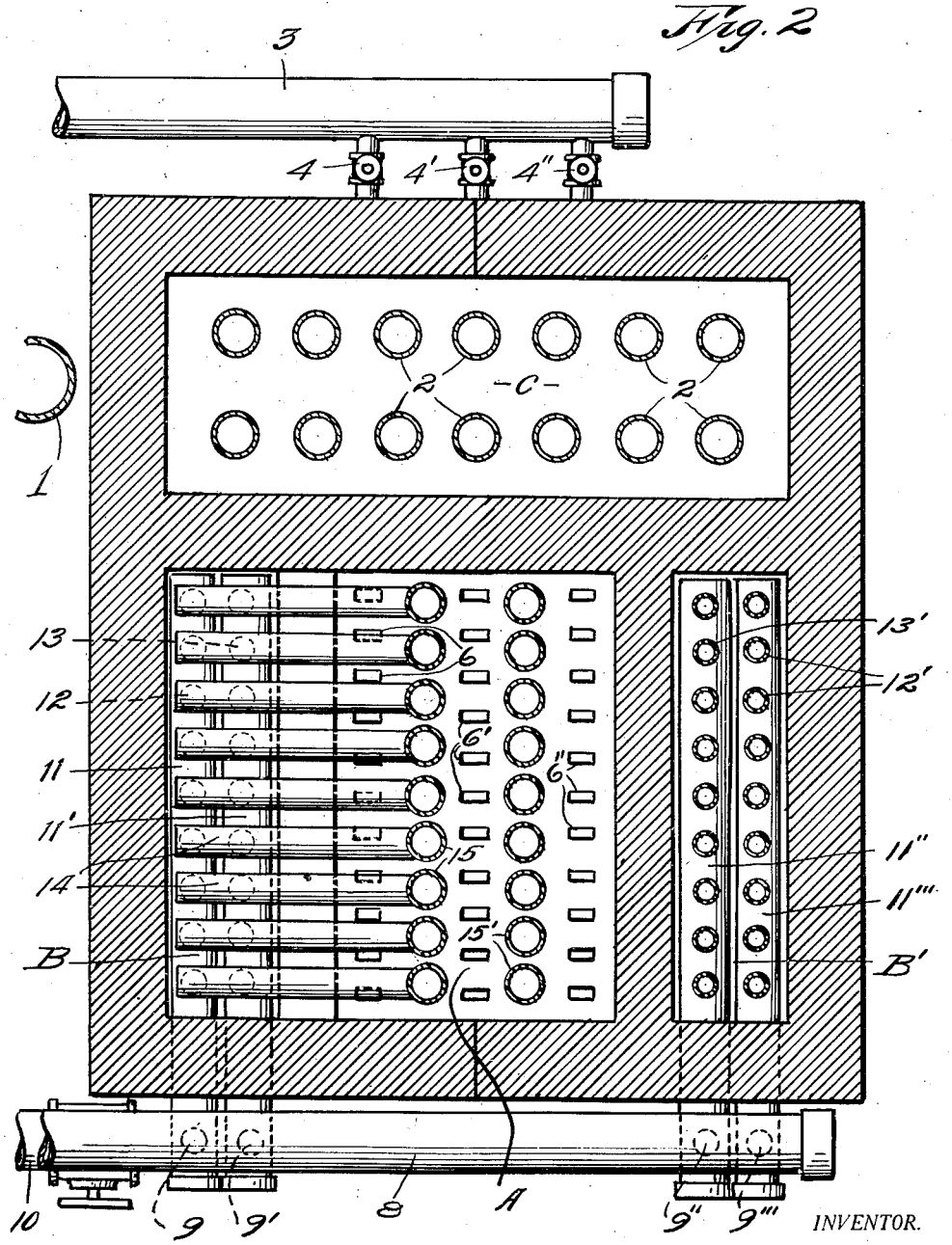

The apparatus in which the production of carbon takes place is shown by the accompanying drawings. Figures 1 and 3 showing a vertical cross section; Figure 2, a horizontal cross section. It consists essentially of a dissociation chamber A; a preheating chamber or, as in the preferred form, two preheating chambers B' and B'' adjacent to and connected with A; and a heat exchange C shown in Figure 2. The function of the several parts will be better understood by explaining the procedure of operation.

Supply of heat. Air, under pressure and in controlled volume, is supplied through pipe 1 and passes down through a system of pipes 2—2 in C counter current to the rising products of combustion. It is united in a gas mixer in the base of C with combustible gas supplied through 4, 4', and 4'' from main 3. Being ignited it burns in combustion chambers 5, 5' and 5'' and the hot combustion gases rise through outlets 6, 6' and 6'', as more fully shown in Figure 1, and pass up through A, thence down through B and B' passing through arched openings 7, 7 not shown, 7' shown in Fig. 1 and 7' into the base C and thence to the air. Simultaneously the hydrocarbons which it is desired to dissociate are admitted from main supply pipe 8 through 9—9'' to 11 and 11' and by corresponding pipes not shown to 11'' and 11''' in the base of B'. The rate of combustion and the rate at which the hydrocarbons are admitted will be so controlled that the hydrocarbons are brought to a temperature close to that at which dissociation according to the equation $$CH_4 + heat = C + 2H_2$$

begins to be appreciable by the time that, having passed through 14 and 14', they enter vertical tubes 15 and 15'.

The pipes within B, B' and A will preferably be of a heat resisting alloy. As is well known, iron and nickel act as catalysts to promote the desired reaction, but I may elect to substitute conduits of silica carbide or other highly refractory material in the more highly heated zone of A. In order to prevent loss of carbon by adherence to the walls, I find it desirable that the gas shall be passing downward during the period that carbon is being given off; that the height of the conduits be greatly increased as compared with past practice, so that the hydrocarbons may be given a high velocity of travel and at the same time a sufficient time of contact to complete the dissociation and further to provide an excess of pressure upon the main gas supply such that it is possible at frequent intervals to increase the velocity for a brief period. This may be an almost obvious means of preventing adherence of carbon to the walls, but I do not find that it has been employed or is it mentioned in any one of the numerous prior patents covering plant or procedure directed to carbon recovery. It has been found to yield substantial results in increased recovery. The hot gases bearing carbon may be cooled by spraying with water from 16 and 16' or by surrounding the lower extremity of 15 and 15' with a water jacket. Such portion of the carbon as is deposited in 17 and 17' is removed by helical conveyors 18 and 18'. The remaining carbon is carried forward and may be recovered by screens, deposition in baffled chambers, by electric precipitation or other well known means. Removable lids 19 and 19' are provided upon the upper extremities of 15 and 15' so that any carbon adhering to their interior surfaces may be forced down into 17 and 17' by piston 20.

Means are provided for securing the desired hydrogen-nitrogen mixture in a one stage operation. A controlled volume of air may be admitted through 10 to 11 and through 10' (not shown) to 11''' while hydrocarbon gases are simultaneously admitted to 11' and 11'''. Assuming for simplicity of illustrating the hydrocarbon gas to be a pure methane substantially equal volumes will be admitted. There is not sufficient air to form a combustible mixture, but both air and gas being heated in passing up through the preheating chambers, to a temperature in excess of that at which they ignite, union of the oxygen in the air with the hydrocarbon gas will occur when they are brought together in 14 and 14' and in 15 and 15'. Oxygen unites preferentially with the carbon at temperatures such as are contemplated, but when the initial union is of oxygen with hydrogen forming $H_2O$, there will shortly be a secondary reaction $$CH_4 + H_2O = CO + 3H_2.$$

The complete reaction which it is desired to bring about may be expressed by the equation $$5CH_4 + O_2 + 4N_2 = 3C + 2CO + 10H_2 + 4N_2.$$

Steam in excess is added through sprays 16 and 16' and the gas being cooled the carbon may be removed by any suitable means, the desired proportion of hydrogen and nitrogen may be obtained by passage of the gas of the resultant composition indicated by the equation next above in contact with an iron catalyst effecting thereby the reaction $$2CO + 2H_2O = 2CO_2 + 2H_2.$$

The $CO_2$ being absorbed out, only minor purification is necessary to secure a gaseous mixture suitable for the synthesis of ammonia.

But I find that to secure such completion of the reaction requires not only a temperature somewhat difficult to maintain, even using preheated air to support combustion, but a rather long time of contact in the dissociation zone. The quality of the carbon is reduced by long exposure to high temperature. Better results in the quality of carbon recovered may be obtained by effecting a total dissociation approaching 95% by passing gas only through the dissociation circuit or in series through two units such as have been described, in the second of which a higher temperature is maintained than in the first, recovering the carbon and completing the process in the apparatus shown in Figure 3. This is very similar in general construction to the apparatus shown in Figure 1, but is operated in a quite different way. The pipes and walls are brought to an initially high temperature by maintaining an active combustion in 21 and 21', the combustion gases passing up through 22 and 22', through D and D' and down E and E' passing out through 23 (not shown) and 23'.

Fig. 3 as drawn shows means of introducing a fuel gas into the combustion chambers 21—21', but preheating can be equally well effected by introducing residue gas from the dissociation unit shown in Figs. 1 and 2, through 31 and 31' with the increased proportion of air through 28—28' necessary for complete combustion, igniting the mixture formed in F and continuing preheating till the required temperature has been attained throughout the chamber, means being provided for discharging the combustion gases from the gas circuit beyond outlets 23—23'.

Air is now admitted to 28 and 28 through 27 and 27' (not shown). The gaseous residue from the previous treatment from main 24 is led through 25 into 26 and 25' (not shown) into 26'. If the gas was cooled by spraying with water as indicated in Fig. 1 16—16' no steam need be added. If cooled by external means some addition of steam prior to admission through 26—26' will help to accelerate the reactions desired. They pass upward. The air passes down central conduit F, the gas down conduits F' and F''. They pass through nostrils 29, 29', 29'' and 29''' into 21 and 22'. Being heated above the temperature of ignition, the oxygen of the air unites with the hydrocarbon remaining undecomposed or if with hydrogen there shortly follows a secondary reaction $$CH_4 + H_2O + heat = CO + 3H_2.$$

Let us assume the hydrocarbon to have been a pure methane free from inerts, and a 95% prior dissociation to have been effected, $10CH_4$ has become $CH_4 + 18H_2$.

$$CH_4 + 18H_2 + 1.5O_2 + 6N_2 = \\ CO + 2H_2O + 18H_2 + 6N_2.$$

The CO may be removed by well known means or converted to $CO_2$, which is absorbed out.

A knowledge of the composition of the hydrocarbons being treated, of the inerts actually present and of the degree of dissociation effected, will permit of a close proportioning of air and gas such as achieves very nearly the proportion of hydrogen and nitrogen desired. In the equation given above the breaking up of the $CH_4$ molecule with combustion of the carbon to monoxide generates around 38 B. t. u. per cubic foot. The union of oxygen with the hydrogen generates net 549 B. t. u. per cubic foot. Assuming the gas and air to have been initially heated to 1800° F.; the oxidation which follows their union will generate sufficient additional heat to increase their temperature by 1200° F. less only such reduction as may result from the increase in their specific heat with rise in temperature. We have achieved a final temperature of dissociation higher than could readily have been imparted to the gas by external heating or contact with heated surfaces. Their sensible heat is such that passing up D and D' and down E and E' they will impart to the unmixed air and gas passing counter current a temperature not less than 1800° F. prior to their coming together, hence in continuous operation, the reactions supply the heat necessary to effect completed dissociation. They pass out for further minor purification and use through 23 (not shown) and 23'.

What I claim as new and desire to protect by the issuance to me of Letters Patent is:

1. In apparatus for the thermal dissociation of hydrocarbon gases and vapors, the combination of a dissociation chamber, a preheating chamber, a cross connection between the upper extremities of these chambers, gas and air inlets to the lower extremities of the dissociation chamber and a combustion gas outlet from the lower extremity of the preheating chamber, whereby an active combustion may be maintained and the combustion gases caused to pass to the lower extremity of the preheating chamber, a series of conduits within these chambers extending from the lower extremity of the preheating chamber to the lower extremity of the dissociation chamber, inlets for the admission of gas and air to the conduits at the lower extremity of the preheating chamber and an outlet for the withdrawal of gases from the conduits at the lower extremity of the dissociation chamber, substantially as described.

2. In apparatus for the thermal dissociation of hydrocarbon gases and vapors, the combination of a dissociation chamber, a preheating chamber and a heat exchange chamber, a passage joining the upper extremities of the dissociation chamber and the preheating chamber, a passage connecting the lower extremity of the preheating chamber and the lower extremity of the heat exchange chamber, inlets for the supply of gas and air to the lower extremity of the dissociation chamber, whereby an active combustion may be maintained therein and the combustion gases passed successively up through the dissociation chamber, down through the preheating chamber and thence through the heat exchange chamber, conduits within the heat exchange chamber whereby air may be conveyed through the chamber and through the air inlets to the dissociation chamber, a system of conduits extending from the lower extremity of the preheating chamber to the lower extremity of the dissociation chamber, inlets for the admission of gas and air to these conduits at the lower extremity of the preheating chamber, and an outlet for the withdrawal of the gases from the conduits at the lower extremity of the dissociation chamber, means for supplying air and gas under controlled pressure to the various inlets.

3. In apparatus for the thermal dissociation of hydrocarbon gases and vapors, the combination of a dissociation chamber, a preheating chamber, a passage connecting the upper extremities of these chambers, air and gas inlets to the lower extremity of the dissociation chamber, whereby an active combustion may be maintained within the chamber, a heat exchange chamber, a passage from the base of the preheating chamber into the heat exchange chamber, whereby the combustion gases may be caused to pass successively through the dissociation chamber, the preheating chamber and the heat exchange chamber, conduits within the heat exchange chamber by which air may be passed through the interior of this chamber to the inlets supplying air to the dissociation chamber, a system of conduits extending from the lower extremity of the preheating chamber to the lower extremity of the dissociation chamber, inlets for the supply of hydrocarbon gases to a portion of the conduits at the lower extremity of the preheating chamber and inlets for the supply of air to another portion of the conduits, means for uniting the gas and air at an intermediate point in their travel through the conduits, outlets for the withdrawal of the resultant products from the conduits at the lower extremity of the dissociation chamber.

4. In apparatus for the thermal dissociation of hydrocarbon gases and vapors, the combination of an enclosing chamber, a system of conduits for conveying gases through the chamber, a system of conduits conveying air through the chamber, refractory walled conduits enclosing and forming a combustion chamber and conveying the air and gas to the lower extremity of the combustion chamber, inlets for the admission of gas and air to the lower extremity of the combustion chamber, a passage from the upper extremity of the combustion chamber into the enclosing chamber and outlets for the resultant gases in the base of the enclosing chamber whereby they are caused to pass upward through the combustion chamber and thence through the enclosing chamber in contact with the exterior surfaces of the conduits conveying air and gas through the enclosing chamber to the combustion chamber, substantially as described.

5. In apparatus for the thermal dissociation of hydrocarbon gases and vapors, the combination of a vertical dissociation chamber, vertical conduits within the dissociation chamber, inlets for the admission of gas and air to the lower extremity of the dissociation chamber, whereby an active combustion may be maintained within the space surrounding the conduits, passages from the upper extremity of the dissociation chamber into adjacent vertical preheating chambers on each side of the dissociation chamber, and an outlet from the lower extremity of each of the preheating chambers whereby combustion gases may pass from the dissociation chamber downward through each of the preheating chambers and be discharged therefrom, vertical conduits in the preheating chambers having inlets for the admission of air and gas to their lower extremities and discharging into the conduits within the dissociation chamber, outlets for the discharge of gas from the lower extremities of the conduits within the dissociation chamber.

6. In apparatus for the dissociation of hydrocarbon gases and vapors, the combination of a dissociation chamber and a preheating chamber, a passage connecting the upper extremities, air and gas inlets to the lower extremity of the dissociation chamber and an outlet in the lower extremity of the preheating chamber, whereby an active combustion may be maintained and the combustion gases caused to pass through the chamber to the outlet in the lower extremity of the preheating chamber, a system of conduits within the chambers extending from the lower extremity of the preheating chamber to the lower extremity of the dissociation chamber, inlet for the admission of gas to the conduits at the lower extremity of the preheating chamber, and outlets by which the gas may be withdrawn from the conduits at the lower extremity of the dissociation chamber, an enclosing chamber, conduits within the enclosing chamber conveying the gas to the lower extremity of a refractory walled combustion chamber, conduits within the enclosing chamber conveying air to the lower extremity of the combustion chamber, means for uniting the gas and air within the combustion chamber, a passage from the upper part of the combustion chamber into the enclosing chamber, and outlets in the lower part of the enclosing chamber whereby the product gas is caused to pass up through the combustion chamber and down through the enclosing chamber in contact with the exterior surfaces of the conduits conveying air and gas to the combustion chamber and in a direction of travel substantially counter current to the travel of the air and gas through the conduits.

In witness whereof, I affix my signature.

WILLIAM D. WILCOX.